United States Patent
Roberts et al.

(10) Patent No.: US 8,249,467 B2
(45) Date of Patent: Aug. 21, 2012

(54) SELF TEST OF A DUAL POLARIZATION TRANSMITTER

(75) Inventors: Kim B. Roberts, Nepean (CA); Maurice O'Sullivan, Ottawa (CA); Ian Betty, Ottawa (CA)

(73) Assignee: Ciena Corporation, Linthicum, MD (US)

(*) Notice: Subject to any disclaimer, the term of this patent is extended or adjusted under 35 U.S.C. 154(b) by 258 days.

(21) Appl. No.: 12/721,802

(22) Filed: Mar. 11, 2010

(65) Prior Publication Data
US 2011/0222850 A1  Sep. 15, 2011

(51) Int. Cl.
H04B 10/00 (2006.01)
H04B 10/06 (2006.01)
H04J 14/06 (2006.01)
(52) U.S. Cl. .................. 398/205; 398/65; 398/158
(58) Field of Classification Search .......... 398/26, 398/27, 33, 158, 159, 182, 183, 185, 192, 398/195–198, 205, 65
See application file for complete search history.

(56) References Cited

U.S. PATENT DOCUMENTS

| 7,676,161 B2 | 3/2010 | Roberts et al. |
| 2004/0091231 A1* | 5/2004 | Hofmeister et al. .......... 385/147 |
| 2009/0041473 A1* | 2/2009 | Nishihara et al. ............ 398/188 |
| 2010/0021166 A1* | 1/2010 | Way .................................. 398/79 |
| 2010/0215374 A1* | 8/2010 | Liu et al. ......................... 398/98 |

* cited by examiner

Primary Examiner — Dalzid Singh
(74) Attorney, Agent, or Firm — Kent Daniels; Blake, Cassels & Graydon LLP

(57) ABSTRACT

A method of testing a dual-polarization optical transmitter comprising a pair of polarization transmitters for respectively generating first and second polarization signals, and a polarization combiner for generating an optical signal composed of the first and second polarization signals with respective orthogonal polarization vectors. Each of the polarization transmitters is controlled to transmit respective polarization optical signals having predetermined characteristics. An output of the dual-polarization optical transmitter is tapped to obtain a first tap signal representative of the first polarization signal, and a second tap signal representative of the second polarization signal. A relative angle between respective polarization vectors of the tap signals is controlled, and the first and second tap signals combined to generate a combined light. A power level of the combined light is detected, and processed to obtain information about the performance of the dual polarization transmitter.

24 Claims, 6 Drawing Sheets

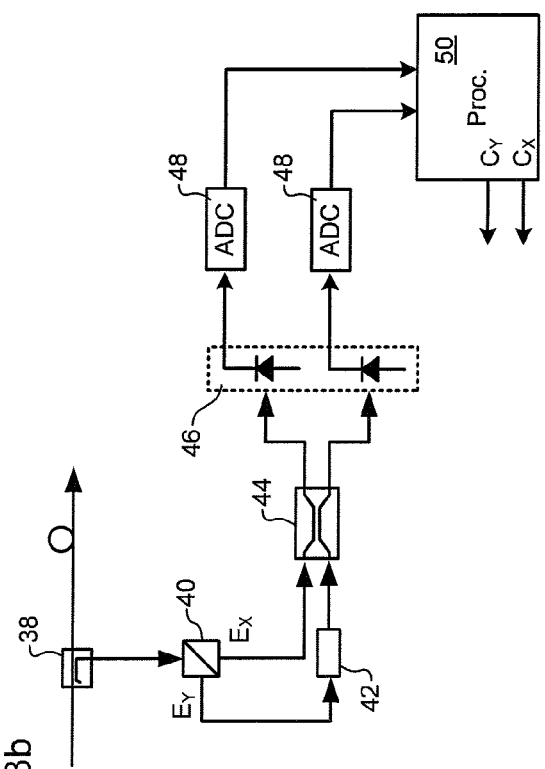
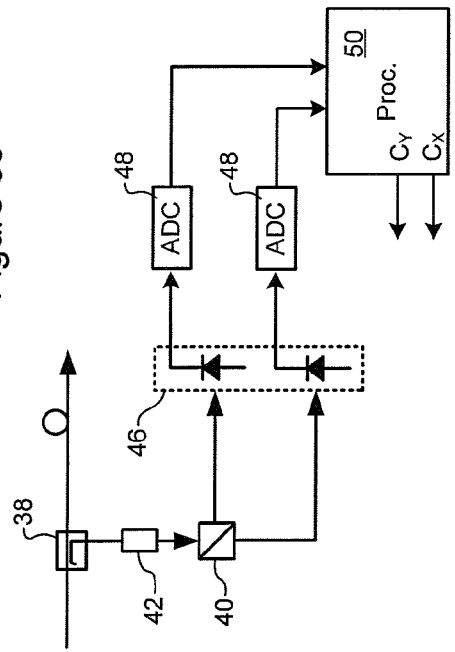
Figure 3b
Figure 3c

SELF TEST OF A DUAL POLARIZATION TRANSMITTER

CROSS-REFERENCE TO RELATED APPLICATIONS

This is the first application filed in respect of the present invention.

MICROFICHE APPENDIX

Not Applicable.

TECHNICAL FIELD

The present invention relates generally to optical communication systems, and in particular to self test of a dual polarization transmitter.

BACKGROUND

Applicant's U.S. Patent Application Publication Ser. No. 2006/0127102, which was filed Dec. 10, 2004 and allowed Nov. 19, 2009, teaches methods and systems for controlling a transmitter capable of synthesizing an arbitrary optical E-field waveform. FIG. 1a schematically illustrates a transmitter 2 implementing methods in accordance with in accordance with Applicant's U.S. Patent Application Publication Ser. No. 2006/0127102. As may be seen in FIG. 1, a signal synthesizer 4 provides a high-speed signal path comprising a signal processor 6, a linearizer 8, and a pair of Digital-to-Analog Converters (DACs) 10x, where 'x' is an index. The Signal processor 6 receives a data signal X(t) as an input, and uses a compensation function C[ ] to compute parallel multi-bit In-phase and Quadrature sample streams ($E_I(n)$ and $E_Q(n)$, respectively) representing successive loci of the end-point of a desired or target optical E-field vector. The linearizer 8 then uses the multi-bit ($E_I(n)$, $E_Q(n)$) loci to synthesize a pair of multi-bit digital drive signals $V_R(n)$ and $V_L(n)$. The digital drive signals $V_X(n)$ are then converted into analog (RF) signals by respective high speed multi-bit Digital-to-Analog Converters (DACs) 10, and then amplified (and possibly band-pass filtered to remove out-of-band noise) to generate a pair of parallel analog drive signals $S_X(t)$, which are output from the synthesizer 4.

The analog drive signals $S_X(t)$ output from the synthesizer 4 are supplied to a complex Electrical-to Optical (E/O) converter 12 to generate an optical E-field $E_O(t)$ at the complex E/O converter output 14. An optical coupler 16 and detector 18 samples the output optical E-field $E_O(t)$, and supplies the samples to a controller unit 20, which detects an error between the actual output optical E-field $E_O(t)$ and the desired complex E-field waveform as represented by the parallel multi-bit In-phase and Quadrature sample streams ($E_I(n)$ and $E_Q(n)$). The controller unit 20 then adjusts at least one parameter of the transmitter to minimize the detected error. With this arrangement, controller 20 operates to control the transmitter to produce an optical E-field $E_O(t)$ at the complex E/O converter output 14 which is a high-fidelity reproduction of the target E-field computed by the signal processor 6.

In general, the signal processor 6 is capable of implementing any desired mathematical function, which means that the compensation function C[ ] can be selected to compensate any desired signal impairments, including, but not limited to, dispersion, Self-Phase Modulation (SPM), Cross-Phase Modulation (XPM), four-wave mixing and polarization dependent effects (PDEs) such as polarization dependent loss. In addition, the compensation function C[ ] can be dynamically adjusted for changes in the optical properties of the link, and component drift due to aging. The inherent flexibility of the mathematical function implemented by the signal processor 6 also implies that the signal processor 6 can be placed into a "test" mode, and used to generate ($E_I(n)$, $E_Q(n)$) loci of a desired optical E-field vector independently (or even in the absence) of an input data signal X(t).

The linearizer 8 can also implement any desired mathematical function, and thus can perform signal format conversion (i.e. from Cartesian to polar coordinates); compensate for non-linearities in the signal path between the linearizer 4 and the output 14 of the complex E/O converter 12; and perform various scaling and clipping operations to limit dynamic range requirements of electrical components downstream of the linearizer 8 (principally the DACs 8).

The resolution of each analog drive signal $S_X(t)$ is governed by that of the DACs 8. In general, each DAC 8 has a resolution of M-bits, where M is an integer, which yields excursions of each analog drive signal $S_X(t)$ between $2^M$ discrete levels. It will be noted that M=1 represents a trivial case, in which each analog drive signal $S_X(t)$ is a bi-state signal. In preferred embodiments, M is greater than 4.

The complex E/O converter 12 will normally be provided as either a conventional dual branch MZ interferometer, or as nested MZ interferometers, both of which are known in the art. In either case, a laser 22 is driven to produce a narrow-band optical carrier, which is supplied to each branch 24 of the E/O converter 12. The resulting modulated branch signals are then combined at the output 14 of the E/O converter 12 to produce the optical E-field $E_O(t)$. FIG. 1b illustrates an alternative arrangement, in which the modulated branch signals in each branch 24 of the E/O converter 12 are combined using a 2×2 signal combiner 26. As is known in the art, such a combiner generates two output signals, both of which are the product of mixing to the modulated branch signals from each branch 24. One of these output signals may be designated as a "main" signal, and is coupled to the output 14 of the E/O converter 12 as the output optical signal $E_O(t)$. The other signal may be designated as a "complementary" signal, and is supplied to the detector 18. This arrangement is beneficial in that the complementary signal enables error detection and control of the transmitter, without requiring a separate splitter 16 to sample the output signal $E_O(t)$.

Multi-bit digital generation of the drive signals $S_X(t)$ in this manner enables the optical transmitter to synthesize any desired E-field waveform at the output 14 of the complex E/O converter 12. Because the linearizer 8 synthesizes the digital drive signals $V_X(n)$ based on a model of the target optical E-field (as opposed to the data signal being transmitted), it is possible to derive a mathematical representation of the entire data path between the signal processor 6 and the E/O converter output 14, which enables phase and amplitude of the output E-field $E_O(t)$ to be independently controlled, even with significant coupling of phase and amplitude responses of the complex E/O converter 12.

The disclosure of U.S. Patent Application Publication Ser. No. 2006/0127102 focuses on embodiments in which the electrical-to-optical (E/O) converter 12 generates the output optical E-field as either an un-polarized or a linearly polarized signal having a single polarization. As is known in the art, one method of increasing the line rate of an optical channel is by generating two independent linearly polarized optical signals having the same carrier wavelength and orthogonal polarization angles. The two polarized optical signals can then be polarization-multiplexed together to produce a polarization multiplexed optical signal for transmission through an optical fibre link to a receiver. Since the two orthogonal polarization signals are independent, the techniques described in U.S. Patent Application Publication Ser. No. 2006/0127102 may be applied to the case of a dual polarization transmitter, by duplicating the system of FIG. 1 for each polarization. FIG. 2 schematically illustrates a dual polarization transmitter 28 of this type.

Referring to FIG. 2, the dual polarization transmitter 28 comprises, for each of the X- and Y-polarizations, a respective transmitter 2 as described above with reference to FIG. 1. Thus, the X-Polarization transmitter $2_X$ includes a respective synthesizer $4_X$ which generates a pair of analog drive signals $S_{XR}$, $S_{XL}$ for driving a corresponding complex E/O converter $12_X$ to output a X-Polarization optical signal $E_X$, as described above with reference to FIGS. 1a and 1b. The Y-Polarization transmitter $2_Y$ is configured in a substantially identical manner, and outputs a corresponding Y-Polarization optical signal $E_Y$. The polarization optical signals $E_X$ and $E_Y$ are then combined using a polarization beam combiner 30 to yield a polarization multiplexed optical signal $E_{OUT}$ at an output 32 of the transmitter 28. In the embodiment of FIG. 2, a common laser 22 is used to generate a narrow-band carrier light, which is then split into respective carrier lights for each of the X- and Y-Polarizations using a polarization beam splitter 34.

The arrangement of FIG. 2 provides a high degree of control over the parameters of each polarization signal $E_X$ and $E_Y$. Thus, for example, a dual polarization transmitter 28 implementing the methods of U.S. Patent Application Publication Ser. No. 2006/0127102 is capable of generating a polarization multiplexed optical signal $E_{OUT}$, in which each of the orthogonal polarization signals $E_X$ and $E_Y$ may have any desired E-field envelope, limited primarily by the dynamic range of each polarization transmitter 2.

It is frequently desirable to be able to measure the optical performance of a dual polarization transmitter. For example, during manufacture of the transmitter, it is necessary to ensure that it is operating properly. The methods of U.S. Patent Application Publication Ser. No. 2006/0127102 are capable of compensating non-ideal performance of the transmitter, and so can accommodate performance variations within normal manufacturing tolerances. However, it is still necessary to characterise the optical performance of each transmitter, and ensure that it falls within the design specifications.

Typically, the optical performance of a dual polarization transmitter is measured by tapping optical signals at various points in the transmitter, and supplying the tapped optical signals to a set of specialized optical analysis equipment. For example, optical spectrum analysers can be used to measure the spectral response of each polarization. Other types of test and measurement equipment, such as oscilloscopes, phase detectors etc. may be used to measure other optical performance parameters of the transmitter.

However, optical signal analysis equipment of this type tends to be very expensive. This equipment also tends to be quite bulky, and can be fairly fragile. In a manufacturing environment, these factors tend to increase the manufacturing costs of the transmitters. The bulk and sensitivity of the equipment severally limits its mobility, and so makes it very difficult to analyse the performance of transmitters in the field, for example during System Layout and Test (SLAT), or maintenance of installed transmitters.

Techniques that enable cost effective evaluation of dual polarization transmitters remain highly desirable.

SUMMARY

There are disclosed methods and techniques for testing the performance of a dual polarization optical transmitter.

In one aspect of the invention, a method of testing a dual-polarization optical transmitter comprising a pair of polarization transmitters for respectively generating first and second polarization signals, and a polarization combiner for generating an optical signal composed of the first and second polarization signals with respective orthogonal polarization vectors. Each of the polarization transmitters is controlled to transmit respective polarization optical signals having predetermined characteristics. An output of the dual-polarization optical transmitter is tapped to obtain a first tap signal representative of the first polarization signal, and a second tap signal representative of the second polarization signal. A relative angle between respective polarization vectors of the tap signals is controlled, and the first and second tap signals combined to generate a combined light. A power level of the combined light is detected, and processed to obtain information about the performance of the dual polarization transmitter.

BRIEF DESCRIPTION OF THE DRAWINGS

Representative embodiments of the invention will now be described by way of example only with reference to the accompanying drawings, in which:

FIG. 2 schematically illustrates principal elements and operations of a dual-polarization optical transmitting incorporating a pair of transmitters of the type illustrated in FIG. 1a;

FIGS. 3a-3c schematically illustrate principal elements and operations of a self test system in accordance with representative embodiments of the invention;

It will be noted that throughout the appended drawings, like features are identified by like reference numerals.

DETAILED DESCRIPTION

The present invention provides a self-test system and method for testing the performance of a dual polarization optical transmitter.

Figure 2:
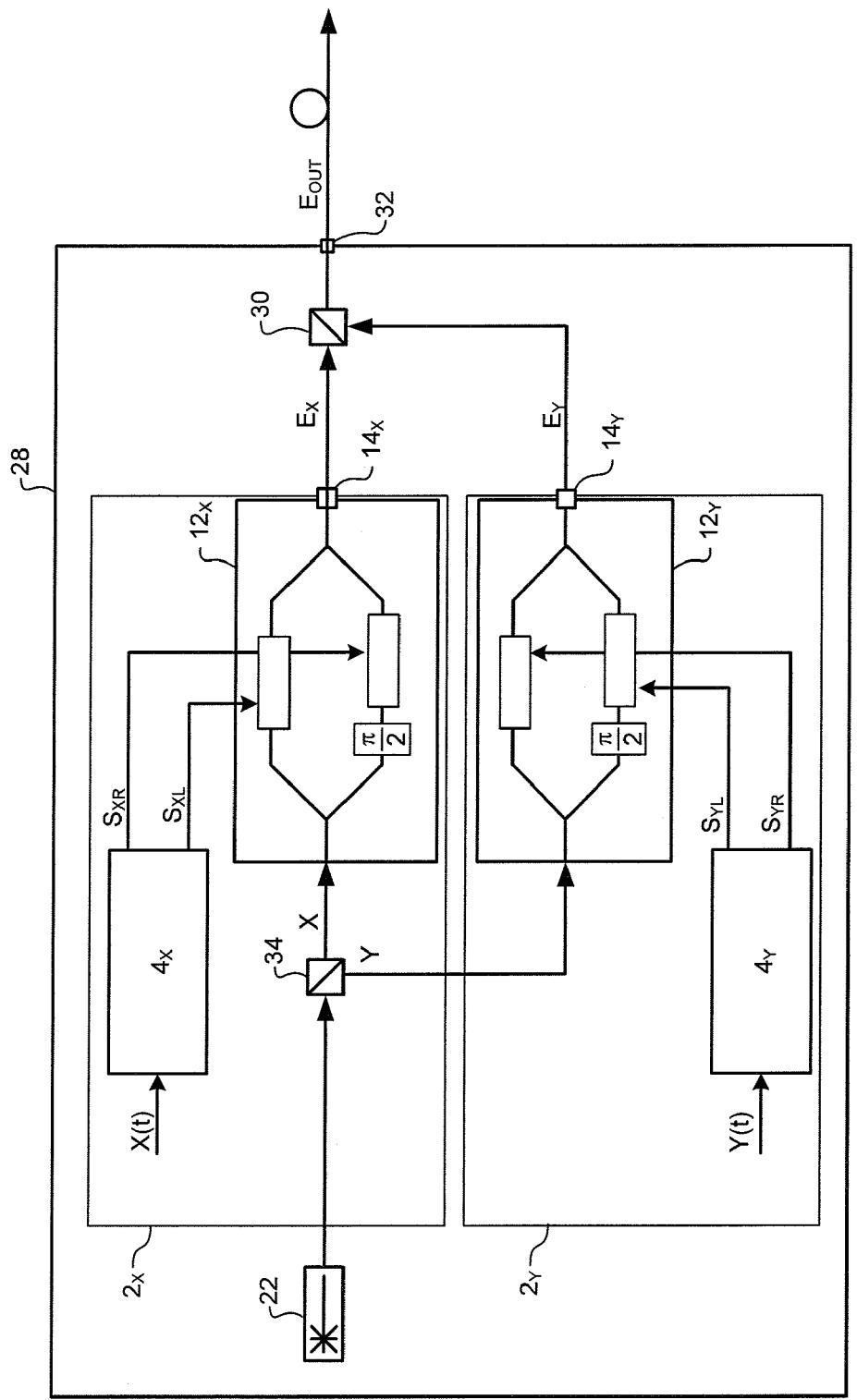
Figure 3A:
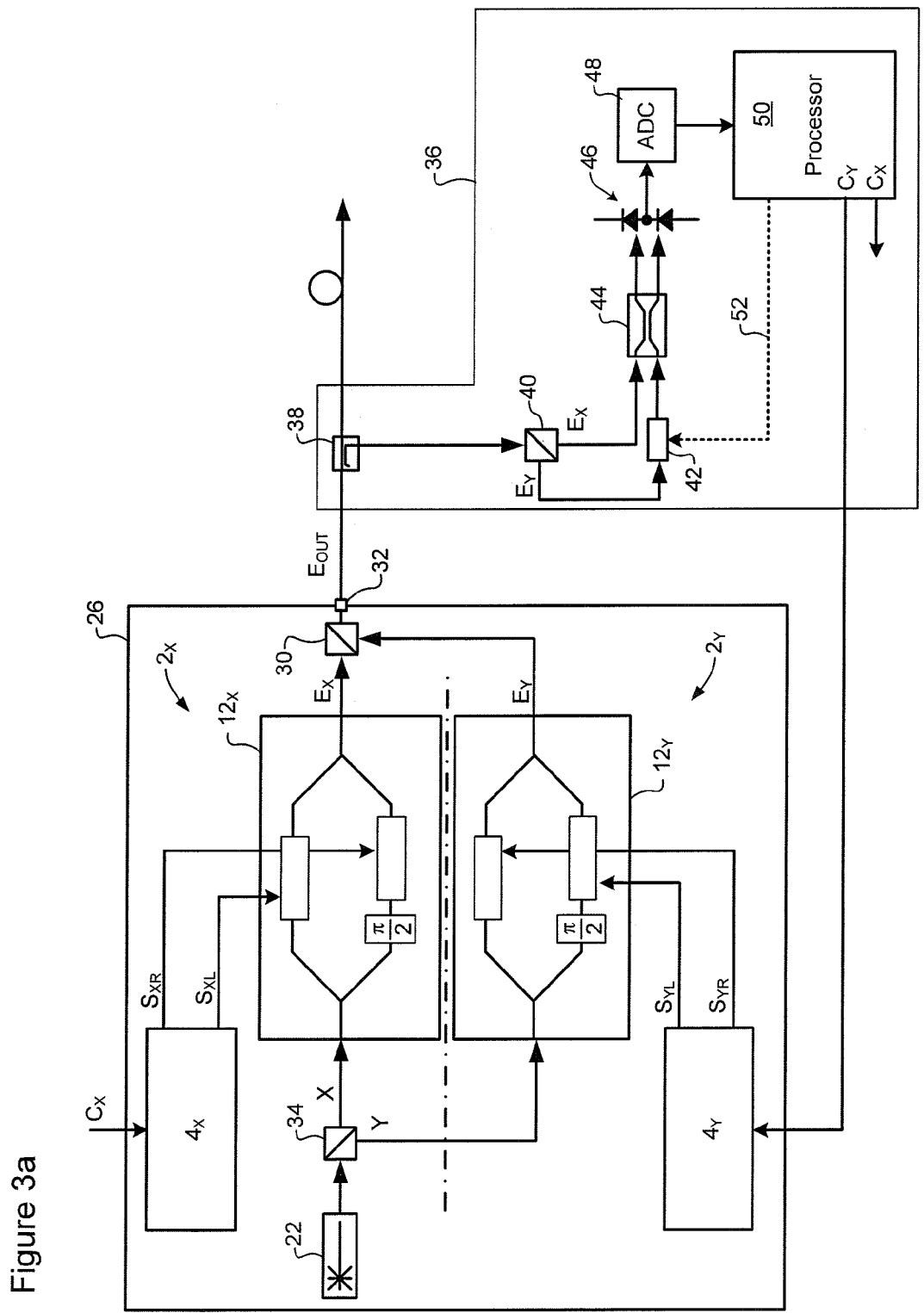

FIG. 3a schematically illustrates a self-test system 34 in accordance with a representative embodiment of the present invention, implemented in a dual polarization transmitter 28 of the type described above with reference to FIG. 2.

Referring to FIG. 3a, the self-test system 36 comprises an optical tap 38 for tapping the polarization multiplexed optical signal $E_{OUT}$ to generate a corresponding dual-polarization tap light; a polarization beam splitter 40 coupled to the optical tap 38 for separating the dual-polarization tap light to obtain first and second tap signals respectively corresponding to the orthogonal polarization signals $E_X$ and $E_Y$; a polarization rotator 42 for setting a desired relative angle between the respective polarization vectors of the first and second tap signals; a 2×2 signal combiner 44 for combining the tap signals and directing the resulting combined light to a photodetector 46; an Analog-to-Digital Converter (ADC) 48 for sampling the photodetector current generated by the photodetector 46 and generating a corresponding stream of multi-bit samples; and a processor 50.

The dual polarization tap light output from the optical tap 38 may comprise any desired portion of the total optical power of the polarization multiplexed optical signal $E_{OUT}$ output from the dual polarization transmitter 28. In some embodiments, the dual polarization tap light may represent substantially all of the optical power of the polarization multiplexed optical signal $E_{OUT}$.

In the embodiment of FIG. 3, the photodetector 46 is provided as a balanced pair of photodiodes. However, other suitable optical detection arrangements may be equally usable. For example, the balanced photodiode pair may be replaced by a single photodiode coupled to receive combined light from only one of the two outputs of the 2×2 signal combiner 44. In another alternative, each output of the 2×2 signal combiner 44 may be supplied to a respective single photodiode, each of which is connected to a respective ADC 48, as may be seen in FIG. 3b.

As will be appreciated, various electrical signal processing components may be used as desired between the photodetector 46 and the ADC 48, such as, for example, a transimpedance or high impedance preamplifier, a DC blocking capacitor, a low pass filter, and an amplifier to obtain the desired analog signal quality and the input to the ADC 48. The use of such devices is well known in the art, and thus is not described herein in detail. Additionally, such devices are not shown in the drawings so as to avoid unnecessary complication of the figures.

Analog detection methods such as a lock-in amplifier could be used. Other electrical test equipment could be used to analyze the beat signal.

In some embodiments, the polarization rotator 42 may be configured to impose a substantially fixed polarization rotation. In other embodiments, the polarization rotation imposed by the polarization rotator 42 may be adjustable, for example using a control signal 52 output by the processor 50 to maximize the beating at the photodetector 46. Note that only those portions of optical signals impinging the photodetector 46 that are of the same polarization (that is, they are copolarized) will beat with each other in the photo detector. Orthogonally polarized components do not beat or mix. Accordingly, while it is often desirable that the two tapped polarization optical signals reaching the photodetector 46 are copolarized for maximum beating, it is sufficient that these signals are merely not orthogonal, because even in this condition there are substantial components of each polarization signal that share a common polarization angle at the photodetector 46.

FIG. 3c illustrates an alternative embodiment, in which the polarization rotator 42 is located between the optical tap 38 and the polarization beam splitter 40. In this case, the polarization rotator 42 operates to rotate the dual-polarization tap light from the optical tap 38 such that the multiplexed polarization signals $E_X$ and $E_Y$ are both oriented at an equal angle (which will normally be about 45°) with respect to the principle axis of the polarization beam splitter 40. With this orientation, the polarization beam splitter 40 will output a pair of linearly polarized optical signals, both of which contains an equal fraction of the polarization signals $E_X$ and $E_Y$. In effect, in the embodiment of FIG. 3c, the polarization beam splitter 40 is used in such a manner that it combines the effects of both the polarization beam splitter 40 and 2×2 combiner 44 of the embodiments of FIGS. 3a and 3b. Consequently, the 2×2 combiner 44 is omitted from the embodiment of FIG. 3c.

Other optical methods could be used to get desired fractions of two optical signals combined and mixed. Optical filters could be included to select part of the optical spectrum of one or both signals. Optical attenuators or amplifiers may also be used, for example to create unequal optical power levels. This may be used to simplify the interpretation of the beat products.

Figure 1A:
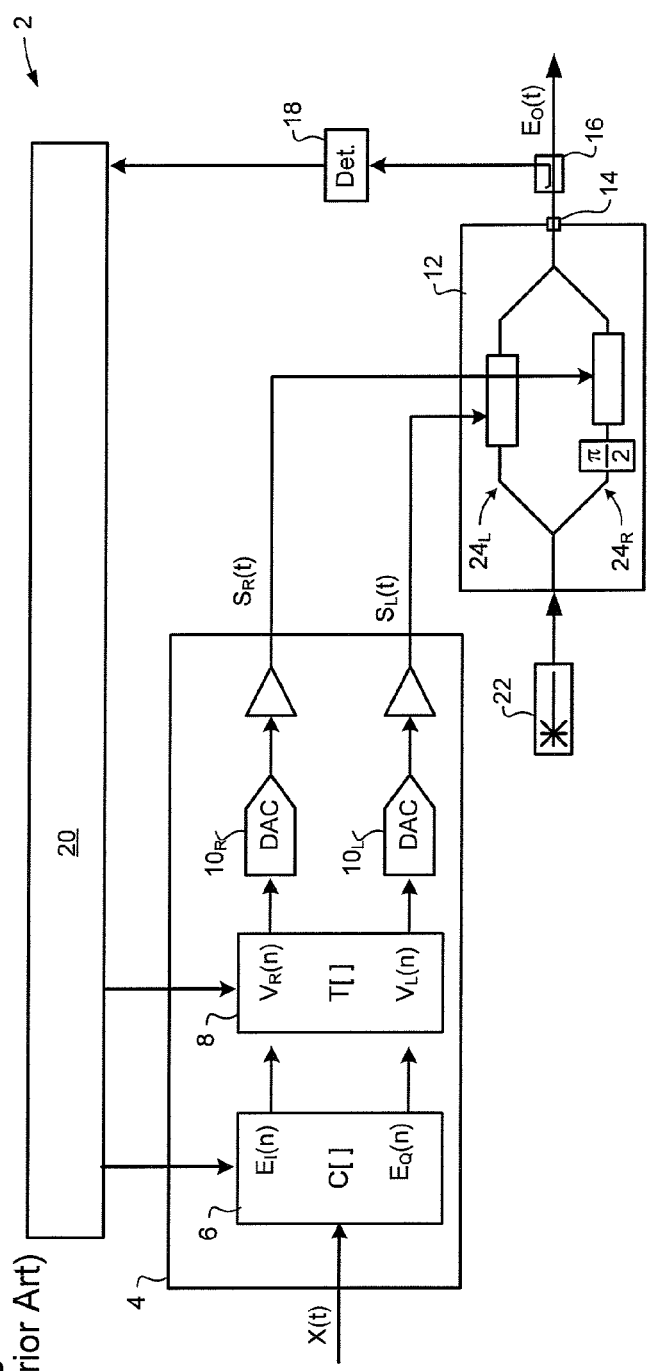
FIGS. 1a and 1b schematically illustrate principal elements and operations of a complex optical transmitter known in the art.
Figure 1B:
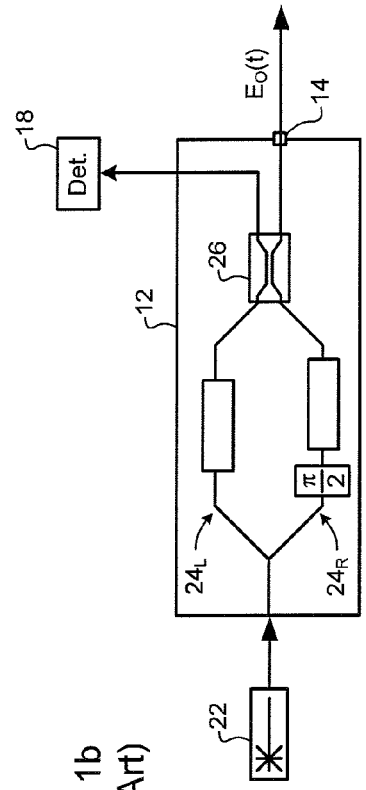

In operation, the processor 50 controls each of the X- and Y-polarization transmitters $2_X, 2_Y$ to generate respective polarization optical signals $E_X$ and $E_Y$ having predetermined characteristics. Thus, for example, the processor 50 may interact with the respective control unit 20 (FIG. 1) of the X-polarization transmitter $2_X$ to place its signal processor 6 into a test mode, and download parameters $C_X$ defining a desired optical E-field vector to the signal processor 6. Thereafter, the X-polarization signal processor 6 will generate ($E_I$(n), $E_Q$(n)) loci of the desired optical E-field vector, and the remaining components of the X-polarization transmitter will operate as described above to produce an X-polarization optical signal $E_X$ that is a high-fidelity reproduction of the desired X-polarization optical E-field vector. Similarly, the processor 50 may interact with the respective control unit 20 (FIG. 1) of the Y-polarization transmitter $2_Y$ to place its signal processor 6 into a test mode, and download parameters $C_Y$ defining a desired optical E-field vector. Thereafter, the Y-polarization signal processor 6 will generate ($E_I$(n), $E_Q$(n)) loci of the desired optical E-field vector, and the remaining components of the Y-polarization transmitter will operate as described above to produce generate a Y-polarization optical signal $E_Y$ that is a high-fidelity reproduction of the desired Y-polarization optical E-field vector.

Figure 4:
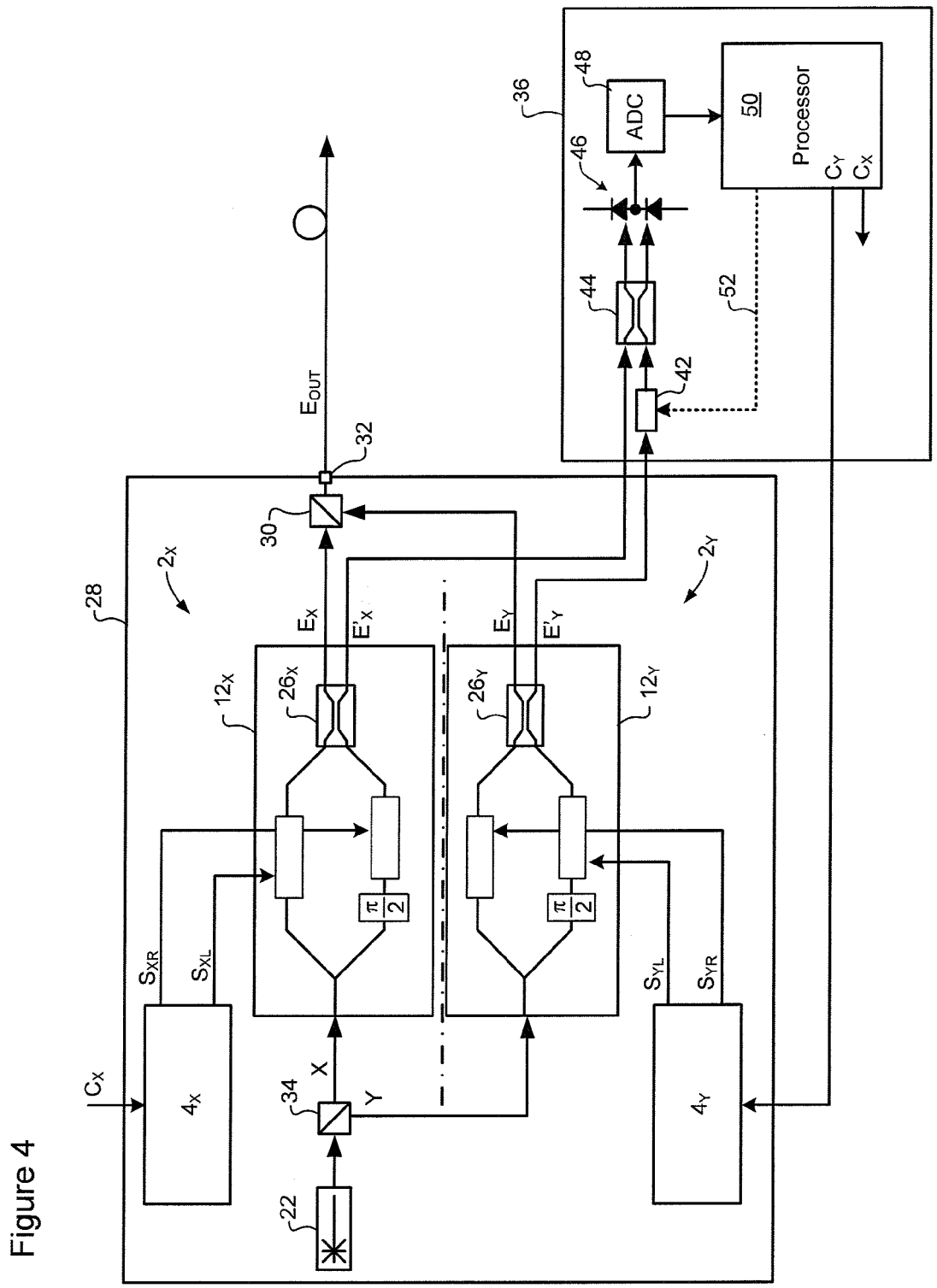
FIG. 4 schematically illustrate principal elements and operations of a self test system in accordance with a second representative embodiment of the invention.

FIG. 4 illustrates an embodiment in which each E/O converter 12 of the transmitter 28 utilizes a 2×2 signal combiner 26, as described above with reference to FIG. 1b. In this case, the optical tap 38 and polarization beam splitter 40 of the self test system 36 can be omitted, and the "complementary" signals $E'_X$ and $E'_Y$ output from the 2×2 signal combiners $26_X$ and $26_Y$ supplied directly to respective inputs of the 2×2 signal combiner 44.

In some embodiments, the self test system 36 is configured as a separate unit from the dual polarization transmitter 28, and suitable electrical and optical connections made between the two devices when it is desired to test the dual polarization transmitter 28.

Figure 5:
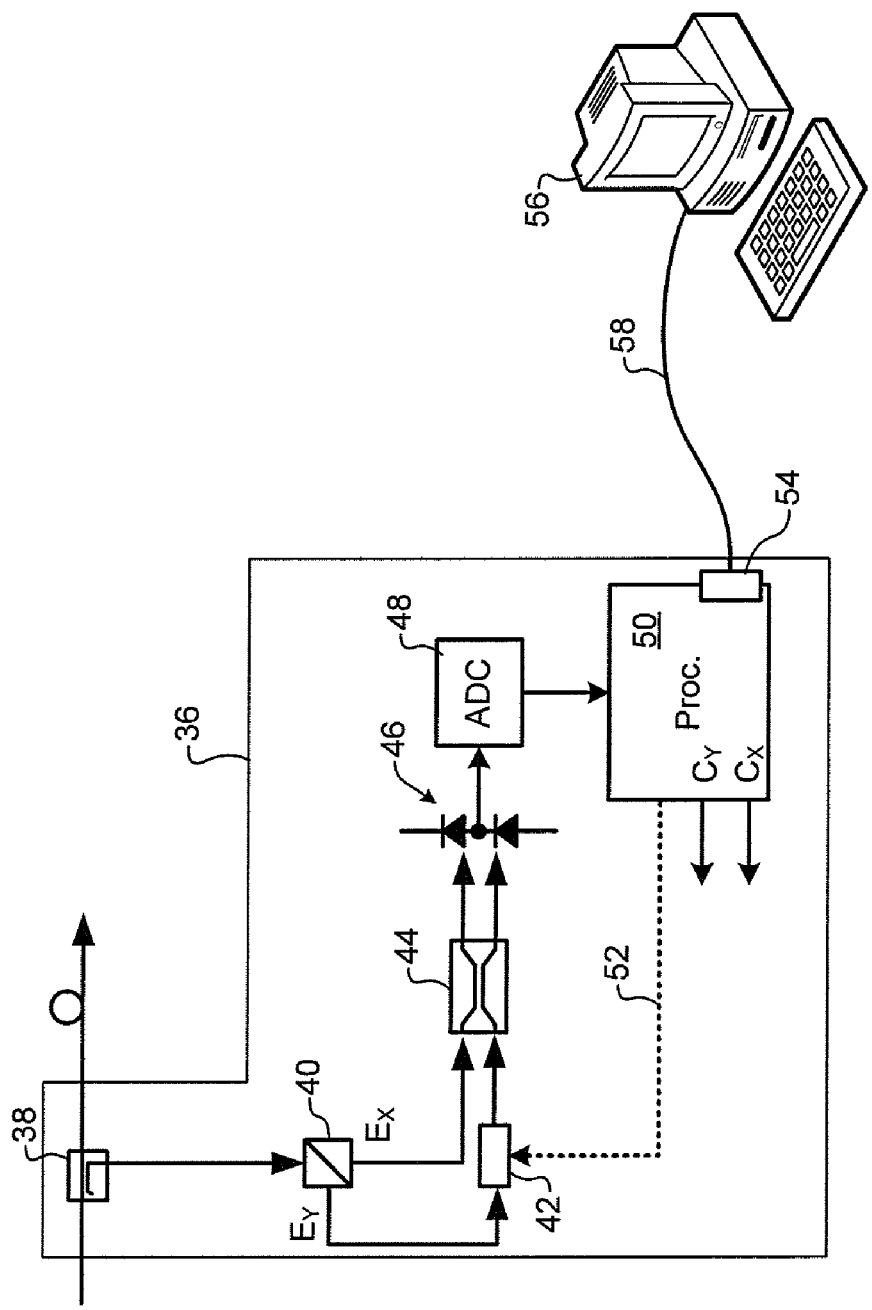
FIG. 5 schematically illustrates operation of the self test system in accordance with a third representative embodiment of the invention.

In other embodiments, the self test system 36 is co-packaged with the dual polarization transmitter 28. This arrangement has advantages in that electrical and optical connections between the dual polarization transmitter 28 and the self test system 36 can be permanently configured and optimised, and little or no external hardware is needed to test the performance of the transmitter 28. It is advantageous that equipment can test itself in the factory or in the field. In some cases, the cost penalty of a co-packaged self test system 36 can be mitigated by minimizing the computation power of processor 50. For example, FIG. 5 illustrates an embodiment in which the processor 50 is provided with an interface 54 for signalling between the self test system 36 and a computer 56, via a cable or wireless connection 58. With this arrangement, the processor 50 operates in response to commands received from software executing on the computer 56 to control the each polarization transmitter $2_X, 2_Y$, and forward samples received from the ADC 48 to the computer 56 for storage and processing.

The self test system 36 described above with reference to FIGS. 3-5 can be used in various ways to analyse the performance of the dual-polarization transmitter 28. For example, an X-polarization test signal could be the inverse of the Y-polarization test signal, and the sum of these two would ideally cancel, producing a null photocurrent. Less than ideally matched signals would produce a non-zero current. Control parameters or other aspects of the unit could be adjusted to minimize this current, to maximize the match between the two test signals. Alternatively, one signal could be distorted so as to minimize this current, producing a rich measure of the mis-match. The characteristics of the photocurrent can be analyzed to measure aspects of the signals. For low cost sampling and signal processing it is desirable that these characteristics are simple and of low frequency. The beating of two appropriately chosen test signals can enable this. Representative performance evaluation techniques are described below, it being understood that those of ordinary skill in the art will, based on the teaching herein, be able to develop other techniques, all of which are considered to fall within the intended scope of the present invention.

The self test system 36 can be operated as a digital spectrum analyser, which measures the spectral response of each polarization transmitter. As may be appreciated, when the polarization signals input to the 2×2 signal combiner 44 are polarization aligned, the two polarization signals will combine to form a beat signal in the combined light incident on the photodetector 46. Accordingly, the spectral response of the X-polarisation transmitter, for example, can be measured by controlling that transmitter to output an optical polarization signal $E_X$ that emulates a data signal; while at the same time controlling the Y-Polarization transmitter to output an optical polarization signal $E_Y$ as a mono-tone sine-wave having a frequency that is progressively swept through a desired frequency range. In this case, for any given frequency value, the low frequency spectral power of the beat signal received by the photodetector 46 is proportional to the spectral power of the X-polarization signal $E_X$ about that frequency. Thus, by correlating the samples received from the A/D converter 46 at each one of a plurality of frequency values, it is possible to obtain the output spectrum of the X-polarization transmitter.

The quality of the optical spectrum measured by this method is dependent on the quality of the sine-wave output from the Y-polarization transmitter. Ideally, this sine-wave would be a pure sine-wave at a single frequency. The transmitters described above with reference to FIGS. 1a and 1b, and in Applicant's U.S. Patent Application Publication Ser. No. 2006/0127102 are capable of generating an output optical signal that closely approximates this ideal. The frequency range over which the X-polarization spectral response can be measured in this manner is limited primarily by the frequency range of the Y-polarization E/O converter $12_Y$. Naturally, this technique can be mirrored to measure the Y-polarization spectral response, if the X pol response has been calibrated.

Spectra measured using the above-technique can be displayed on a monitor, and used to analyse the optical performance of each polarization transmitter using substantially the same techniques as those used in commercially available spectrum analysers.

In addition, drive levels can be tested by driving one polarization transmitter to output a pure sine wave at a frequency of 1 GHz, for example, and measuring harmonics of that drive signal in the resulting spectral response of the other polarization transmitter. This measures the harmonic distortion as a function of drive level.

Other parameters of the dual polarization transmitter 28 can be tested by selecting suitable combinations of signals to be output from the polarization transmitters, and then analysing the resulting combined light output from the signal combiner 44.

For example, DC offset and carrier leakage on one polarization can be measured by phase modulating the other polarization at 20 MHz, for example, and measuring the amplitude of a beat tone at that frequency.

I-Q amplitude match on the X-polarization transmitter can be tested by controlling both polarization transmitters to output a pure sine-wave signal having the same frequency, and then rotating the phase of Y-polarization sine-wave relative to that of the X-polarization. If the I-Q amplitudes are properly matched, the optical power level measured by the photodetector 46 will be sinusoidal with the phase angle. Thus, errors between the measured power level and the expected value is indicative of I-Q amplitude mismatch.

I-Q delay match between polarizations can be tested by controlling the polarization transmitters to output respective signals having the same waveform and frequency, but opposite polarity (e.g. pure sine-wave signals having the same frequency and a phase offset of 180 degrees). When the I-Q delays are properly matched, these two signals should add to zero optical power on the photodetector 46. Thus the measured optical power level is indicative of the I-Q delay mismatch. Control parameters or other aspects of the of the dual polarization transmitter 28 can be adjusted to minimize this current, and so maximize the match between the two test signals. Alternatively, one signal could be distorted so as to minimize this current, and these distortions used to provide a rich measure of the mismatch In embodiments in which the I-Q phase tuning range of the E/O converters 10 is large enough, the I-Q phase on one polarization can be changed by 90 degrees. The I-Q delay test can then be repeated, and again the two polarization signals should add to zero optical power on the photodetector 46 when both transmitters have an I-Q delay difference of zero. Given the sign of the delay has been negated by swapping I and Q, only a zero delay between each I-Q pair can satisfy both this and the previous test.

As may be appreciated, in each of the foregoing examples, a combination of signals to be output from the polarization transmitters is selected for which the combined light output from the 2×2 coupler 42 contains a detectable signal component that is indicative of a performance parameter of the dual polarization transmitter 28. Numerous other signal combinations can be determined to obtain an indication of respective performance parameters of the dual polarization transmitter 28, including, for example, chirp and X-Y power balance.

In some embodiments, the samples output from the ADC 48 are processed to calculate a magnitude or level of a given parameter. For example, as described above, when the E-field transmitted on one polarization is the negative of the E-field transmitted on the other polarization, the optical power level measured by the photodetector 46 is indicative of the I-Q delay mismatch. Thus, the magnitude of the I-Q delay mismatch can be calculated by processing the samples output from the ADC 48 to determine the power level measured by the photodetector 46 at the appropriate frequency, and then correlating the determined power level with the degree of I-Q delay mismatch.

In some embodiments, the samples output from the ADC 48 are processed to evaluate a pass/fail condition of a given parameter. For example, in the case of I-Q delay mismatch, it is known that the power level measured by the photodetector 46 at the appropriate frequency is proportional to the I-Q delay mismatch. Furthermore, when the polarization signals being generated by the respective polarization transmitters are pure sine-waves, the samples output from the ADC 48 are inherently proportional to the measured power level at the appropriate frequency, because there are no other frequency components present in the combined light output from the 2×2 coupler 42. Accordingly, it is possible to define a range of sample values for which the I-Q delay mismatch will inevitably be outside the allowable tolerance for the dual polarization transmitter 28. Thus, rather than compute the actual I-Q delay mismatch, a simplified processing can be used in which the polarization transmitters are controlled to output pure sine-wave signals having the same frequency and a phase offset of 180 degrees, and then the samples output from the ADC 48 are compared to a threshold value to determine whether or not the I-Q delay mismatch is within allowable limits. This approach can be extended to other performance parameters of the dual polarization transmitter 28, to yield a set of pass/fail tests which can be used to rapidly determine whether or not the performance of the dual polarization transmitter 28 is within its design tolerances. These test will not provide actual parameter values, such would be needed to diagnose a problem, but this level of detail is not needed in situations where it is merely desired to identify whether or not a problem exists. The implementation of a set of pass/fail tests is particularly suitable for embodiments in which the self test system 36 is co-packaged with the dual polarization transmitter 28. Thus, for example, the self test system 36 may be configured to perform the set of pass/fail tests automatically as part of a boot-up sequence (e.g. upon supply of power to the transmitter 28). In this case, if the all of the tests result in a "pass" condition, the processor 50 may signal that the transmitter 28 is operating properly by, for example, illuminating a green light emitting diode (LED), and illuminate a red or yellow LED otherwise. With this arrangement, a technician installing the transmitter 28 can quickly and easily determine whether or not the transmitter 28 is operating properly, without having to connect any external test equipment.

In the embodiments described above with reference to FIGS. 3-5, the transmitter 28 is provided as a pair of parallel polarization transmitters 2, each of which operates independently of the other. However, a common laser 20 is used, which has an advantage in that it ensures that the two polarization signals $E_X$ and $E_Y$ have coherent carriers and so avoids carrier phase noise effects. Alternatively, separate lasers could be used in each polarization transmitter 2, and the resulting carrier phase noise between the separate lasers mitigated using known methods, or the tests chosen such that phase noise issues are avoided.

The self test system 36 of the present invention is not limited to use in conjunction with dual-polarization transmitters 28 of the type illustrated in FIGS. 2-4. Any transmitter designed to generate a dual polarization optical signal may be tested using the methods and system described herein, provided only that the optical e-field envelope of each polarization signal can be precisely controlled independently of the other polarization.

Although the invention has been described with reference to certain specific embodiments, various modifications thereof will be apparent to those skilled in the art without departing from the spirit and scope of the invention as outlined in the claims appended hereto.

We claim:

1. A method of testing a dual-polarization optical transmitter comprising a pair of polarization transmitters for respectively generating first and second polarization signals, and a combiner for generating an optical signal composed of the first and second polarization signals with respective different polarization vectors, the method comprising:
   controlling each of the polarization transmitters to transmit respective polarization optical signals having predetermined characteristics;
   tapping an output of the dual-polarization optical transmitter to obtain a first tap signal representative of the first polarization signal, and a second tap signal representative of the second polarization signal;
   combining the first and second tap signals to generate a combined light wherein at least a component of the first tap signal and a component of the second tap signal are co-polarized; and
   detecting a power level of the combined light.

2. The method as claimed in claim 1, wherein tapping an output of the dual-polarization optical transmitter comprises tapping the optical signal transmitted by the dual-polarization optical transmitter to obtain a dual polarization tap light including the first and second tap signal.

3. The method as claimed in claim 2, wherein combining the first and second tap signals comprises:
   polarization splitting the dual polarization tap light to separate the first and second tap signals;
   adjusting a polarization angle of at least one of the first and second tap signals, such that at least a component of the first tap signal and a component of the second tap signal are co-polarized; and
   combining at least the co-polarized components of the first and second tap signals.

4. The method as claimed in claim 3, wherein adjusting the polarization angle comprising rotating the polarization vector of at least one of the tap signals such that the first and second tap signals are co-polarized.

5. The method as claimed in claim 2, wherein combining the first and second tap signals comprises supplying the dual polarization tap light to a polarization beam splitter such that respective polarization vectors of the first ad second tap signals are oriented at an equal angle with respect to a principle axis of the polarization beam splitter.

6. The method as claimed in claim 1, wherein tapping an output of the dual-polarization optical transmitter comprises tapping a complementary output of each polarization transmitter to obtain the first and second tap signals.

7. The method as claimed in claim 6, wherein combining the first and second tap signals comprises:
   adjusting a polarization angle of at least one of the first and second tap signals, such that at least a component of the first tap signal and a component of the second tap signal are co-polarized; and
   combining at least the co-polarized components of the first and second tap signals.

8. The method as claimed in claim 1, further comprising processing the detected power to calculate a value of a selected performance parameter of the dual-polarization optical transmitter.

9. The method as claimed in claim 1, further comprising comparing a detected feature to a predetermined threshold value.

10. The method as claimed in claim 9, wherein the predetermined threshold value is based on a tolerance of selected performance parameter of the dual-polarization optical transmitter.

11. A system for testing a dual-polarization optical transmitter comprising a pair of polarization transmitters for respectively generating first and second polarization signals, and a combiner for generating an optical signal composed of the first and second polarization signals with respective different polarization vectors, the system comprising:
   a processor for controlling each of the polarization transmitters to transmit respective polarization optical signals having predetermined characteristics;
   means for tapping an output of the dual-polarization optical transmitter to obtain a first tap signal representative of the first polarization signal, and a second tap signal representative of the second polarization signal;

means for combining the first and second tap signals to generate a combined light wherein at least a component of the first tap signal and a component of the second tap signal are co-polarized; and a photodetector for detecting a power level of the combined light.

12. The system as claimed in claim 11, wherein the means for tapping an output of the dual-polarization optical transmitter comprises an optical tap connected to tap the optical signal transmitted by the dual-polarization optical transmitter to obtain a corresponding dual polarization tap light including the first and second tap signal.

13. The system as claimed in claim 12, wherein the means for combining the first and second tap signals comprises:
- a polarization beam splitter configured to split the dual polarization tap light to separate the first and second tap signals;
- a polarization rotator for adjusting a polarization angle of at least one of the first and second tap signals, such that at least a component of the first tap signal and a component of the second tap signal are co-polarized; and
- an optical combiner for combining at least co-polarized components of the first and second tap signals.

14. The system as claimed in claim 13, wherein the polarization rotator is configured to rotate the polarization vector of at least one of the tap signals such that the first and second tap signals are co-polarized.

15. The system as claimed in claim 12, wherein the means for combining the first and second tap signals comprises an optical connection for supplying the dual polarization tap light to a polarization beam splitter such that respective polarization vectors of the first ad second tap signals are oriented at an equal angle with respect to a principle axis of the polarization beam splitter.

16. The system as claimed in claim 15, wherein the optical connection comprises a polarization rotator.

17. The system as claimed in claim 11, wherein the means for tapping an output of the dual-polarization optical transmitter comprises a complementary output port of each polarization transmitter.

18. The system as claimed in claim 17, wherein the means for combining the first and second tap signals comprises:
- a polarization rotator for adjusting a polarization angle of at least one of the first and second tap signals, such that at least a component of the first tap signal and a component of the second tap signal are co-polarized; and
- an optical combiner for combining at least co-polarized components of the first and second tap signals.

19. The system as claimed in claim 11, wherein a polarization rotator is responsive to a control signal from the processor.

20. The system as claimed in claim 11, wherein the processor is further configured to process the detected power level to calculate a value of a selected performance parameter of the dual-polarization optical transmitter.

21. The system as claimed in claim 11, wherein the processor is further configured to compare the detected power level to a predetermined threshold value.

22. The system as claimed in claim 21, wherein the predetermined threshold value is based on a tolerance of a selected performance parameter of the dual-polarization optical transmitter.

23. The system as claimed in claim 11, wherein the processor comprises an interface for signalling between the system and a computer.

24. The system as claimed in claim 11 where the system is co-packaged with the dual-polarization transmitter.

* * * * *